United States Patent
Rockwell

(10) Patent No.: US 6,315,248 B1
(45) Date of Patent: Nov. 13, 2001

(54) METHOD FOR SATELLITE INJECTION USING A SOLID FUEL ROCKET MOTOR

(75) Inventor: Donald Rockwell, Cambridge, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/501,675

(22) Filed: Feb. 10, 2000

(51) Int. Cl.[7] .............................. B64G 1/40; B64G 1/42; B64G 1/24; F02K 1/00; F02K 11/00; F02K 3/00; F03H 1/00; F03H 3/00; F03H 5/00
(52) U.S. Cl. ........................................... 244/172; 244/164
(58) Field of Search ................................. 244/2, 172, 164

(56) References Cited

U.S. PATENT DOCUMENTS 4,387,865 * 6/1983 Howard et al. ..................... 244/3.1
5,186,419 * 2/1993 Scott ................................... 244/164
5,242,135 * 9/1993 Scott ................................... 244/172
5,681,011 * 10/1997 Frazier ............................... 244/164
6,193,187 * 2/2001 Scott et al. .......................... 244/172

* cited by examiner

Primary Examiner—Charles T. Jordan
Assistant Examiner—Christian M. Best
(74) Attorney, Agent, or Firm—John Tarlano

(57) ABSTRACT

A method of injecting a missile, having a solid fuel motor, into a satellite orbit. The method includes determining an along-track displacement and cross-track displacement with respect to the satellite orbit. The method also includes determining a velocity-to-be-gained for the satellite orbit, with respect to the current missile velocity. Along-track and cross-track wasting of the solid fuel motor are used to reach the satellite orbit, at the proper velocity for the satellite orbit, when the solid fuel motor burns out.

3 Claims, 10 Drawing Sheets

POSITION CONTROL WITH
PATH & ENERGY MANAGEMENT STEERING $$\dot{\overline{\Delta R}} = \overline{\Delta V}$$

HODOGRAPH OF
RELATIVE VELOCITY $\overline{\Delta V}_1$
$\overline{\Delta V}_2$
$\overline{\Delta V}_{ave}$
$\overline{\Delta V}_3$
$\overline{\Delta V}_0$

PATH OF RELATIVE
POSITION $\overline{\Delta R}_0$ $\overline{\Delta R}(t_b) = \overline{\Delta R}(t_0) + \overline{\Delta V}_{ave}(t_b - t_0) = 0$

FIG. 4

TYPICAL VELOCITY CONTROL SEQUENCE
FIRST SOLUTION, $t_0$
$V_R = 1.091 \, \Delta V$
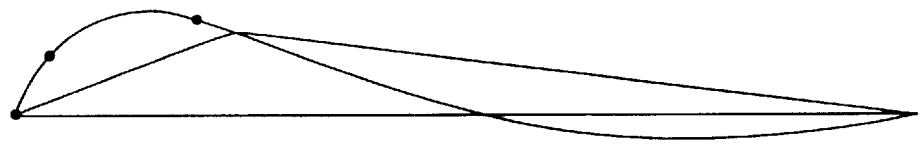
$t_0 + 6.4$ s
$V_R = 1.040 \, \Delta V$
LAST SOLUTION, $t_0 + 13.44$ s
$V_R = 1.029 \, \Delta V$
EXIT TO ENERGY MANAGEMENT STEERING
FIG. 9

METHOD FOR SATELLITE INJECTION USING A SOLID FUEL ROCKET MOTOR

OVERVIEW OF THE INVENTION

The present invention relates to a method for injecting a satellite into a prescribed orbit using a booster with a solid fuel rocket motor. The prescribed orbit can be an arbitrary free fall path in space and the present method will steer the missile to a point on this path at the instant of rocket motor burnout. The present invention achieves the required trajectory without the need for thrust termination.

The basic concept for providing closed-loop control to the required orbit is to make use of two degrees of freedom which are available in the injection stage rocket motor burn. The first of these is the time of injection stage ignition, which can be computed in flight to provide accurate control of the initial "along-track" relative position. As discussed subsequently, this along-track or X direction is defined to be along the initial relative velocity vector. Timing of the injection stage ignition then insures that the displacement between the missile and the desired satellite orbit along this direction of relative motion is at least initially correct.

Control of the remaining "lateral", or Y component of relative position, which is perpendicular to the initial relative velocity vector, can then be obtained by shaping the maneuver used to burn off excess injection stage fuel. It is here assumed that the non-thrust-terminated injection stage will normally have fuel in excess of that required to satisfy the velocity requirement; and the concept is to use this extra energy to provide the necessary position control. It is noted that this excess energy can also be used to make continual adjustments to the along-track position, and thereby desensitize the initial along-track timing control to injection stage motor variations.

The remainder of this disclosure describes the manner in which this path control concept can be implemented, assuming the availability of sufficient injection stage fuel. It is pointed out, however, that the complete guidance concept does provide for a default, or backup control when the lateral position requirements exceed the injection stage motor capability. This condition will be checked in flight during the exit coast, and prior to injection stage ignition. In the event that the position requirement cannot be satisfied, the missile will be guided with steering algorithms that simply seek to achieve a subset of the desired orbital conditions. For example, a backup velocity control which simply nulls the velocity-to-be-gained for achieving a circular orbit at the current position and in the current trajectory plane could be used. In this case, any excess fuel, although not sufficient to completely satisfy the position requirement, will be used to minimize the position error.

DESCRIPTION OF THE DRAWINGS

FIG. 1 thus shows a guidance formulation.

FIG. 2 thus shows energy management steering.

FIG. 3 thus shows path and energy management steering.

FIG. 4 is a diagram of the relationship between the hodograph of FIG. 3 and the corresponding change in relative position, using the presently disclosed method of path and energy management steering. FIG. 4 thus shows position control with path and energy management steering.

FIG. 5 thus shows typical position control capability with path and energy management steering.

FIG. 6 thus shows typical lateral (Y) position control.

FIG. 7 thus shows typical along track (X) position control.

FIG. 8 thus shows nominal injection geometry.

FIG. 9 is a diagram illustrating a typical sequence of control solutions in velocity space, using the presently disclosed method of path and energy-management steering. FIG. 9 thus shows typical velocity control sequence.

FIG. 10 thus shows typical position control sequence.

DISCLOSURE OF THE INVENTION

Guidance Formulation

Figure 1:
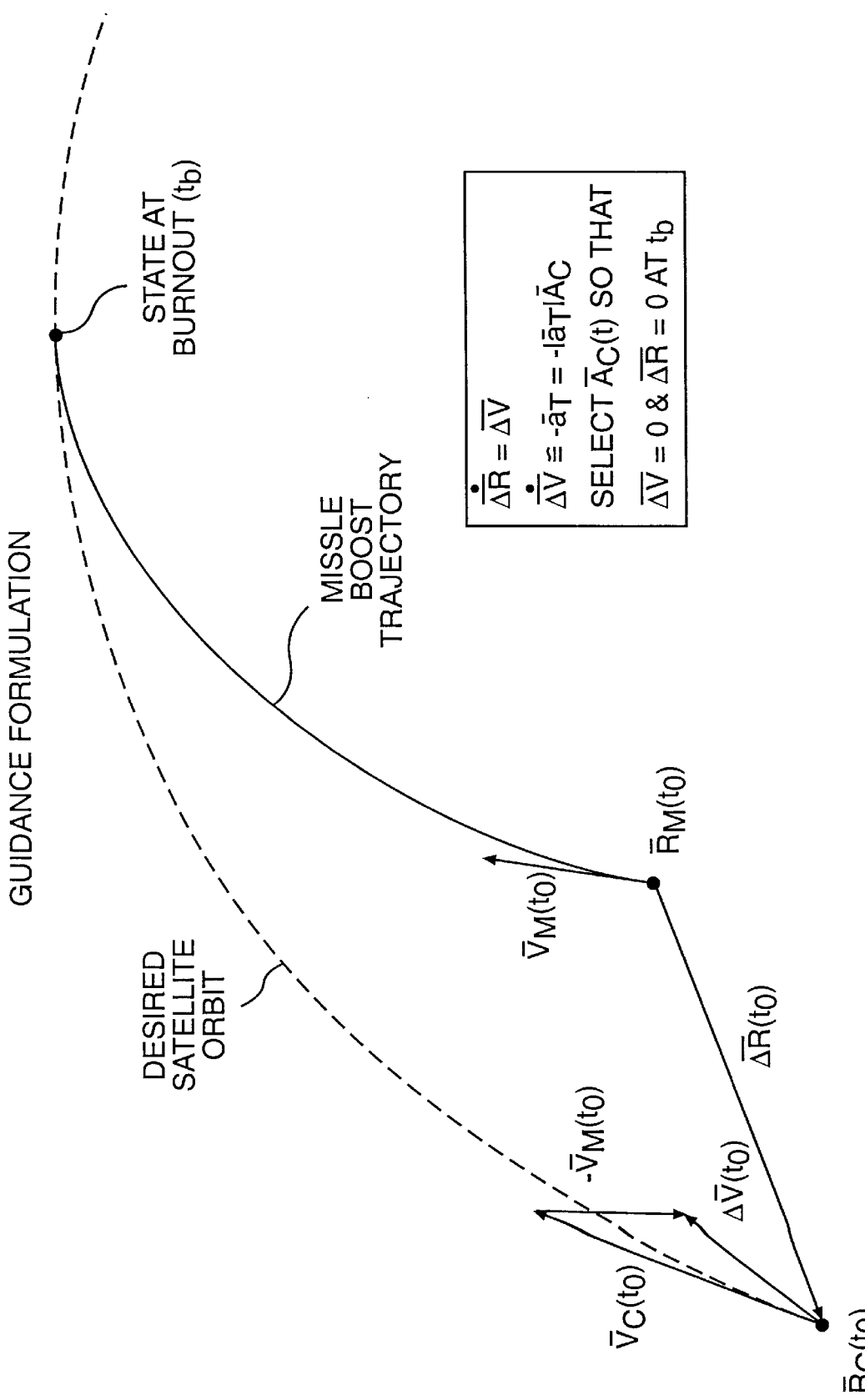
FIG. 1 is a diagram illustrating the celestial mechanics of the guidance problem for the disclosed method of path and energy management steering.

In contrast to the target interception problem that is solved by our current guidance algorithms, the satellite injection problem requires simultaneous control of both position and velocity. As illustrated in FIG. 1, it is imagined that the position and velocity ($\underline{R}_C$ and $\underline{V}_C$) of the desired satellite trajectory, also referred to as the coast or correlated trajectory, are progressing in time along the dashed satellite orbit. The object of the injection stage guidance is to supply steering commands to the missile so that its position and velocity ($\underline{R}_M$ and $\underline{V}_M$) will match those of the satellite at time, $t_b$, the instant of injection stage motor burnout.

Introducing the relative position and velocity vectors:

$$\Delta \underline{R}(t) = \underline{R}_C(t) - \underline{R}_M(t)$$

$$\Delta \underline{V}(t) = \underline{V}_C(t) - \underline{V}_M(t)$$

which also correspond to the instantaneous position and velocity to be gained, the requirements are to make $\Delta \underline{R} = \Delta \underline{V} = 0$ at the time $t_b$. The values of $\Delta \underline{R}$ and $\Delta \underline{V}$ at any initial time, $t_0$, during the injection stage burn can be computed from the outputs of the satellite ($\underline{R}_C$, $\underline{V}_C$) and missile ($\underline{R}_M$, $\underline{V}_M$) navigation computations. Since the rate of change of $\Delta \underline{R}$ is $\Delta \underline{V}$ and since the relative acceleration, $d(\Delta \underline{V})/dt$, can be approximated by the negative of the thrust acceleration, $-\underline{a}_T$, one can achieve the required injection conditions by thrusting in the plane defined by $\Delta \underline{R}(t_0)$ and $\Delta \underline{V}(t_0)$. In other words, and even if the desired satellite orbit and initial boost trajectory are non-coplanar, $\Delta \underline{R}$ and $\Delta \underline{V}$ can be driven to zero by choosing the direction of thrust, $\underline{A}_C$=unit ($\underline{a}_T$), to lie in the plane of relative motion. It is proposed to repetitively calculate the required thrust direction profile during the injection stage burn. The feedback provided by this recomputation will reduce the injection errors due to injection stage motor variations, imperfect autopilot response, the small effects of atmospheric drag, and the difference in gravitation which is ignored by assuming that $d(\Delta\underline{V})/dt=-\underline{a}_T$.

One additional aspect of the problem formulation requires clarification. It is to be noted that the desired satellite orbit is assumed to have a definite phasing requirement. If the time in orbit at a given angular position is not important, this additional degree of freedom can be used to some advantage. The principal benefit is that it becomes unnecessary to compensate for along-track errors introduced by variations in motor performance. As discussed subsequently, this will both simplify the necessary computations and also allow all of the extra energy to be used for lateral control.

Energy Management Steering

Figure 2:
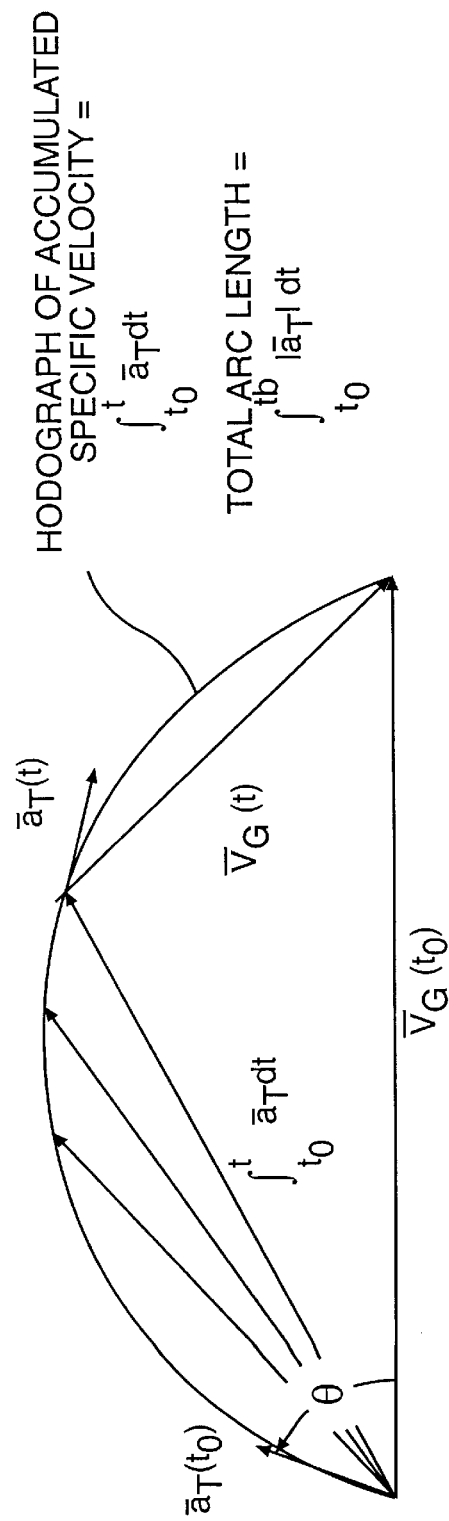
FIG. 2 is a hodograph of velocities for a missile having a solid fuel motor, using the previous method of energy management steering.

The proposed solution to the satellite injection problem is a direct extension of the Energy Management Steering which has been used previously to provide velocity control only. The purpose of this previous and simpler algorithm is to provide steering commands that will deplete excess fuel so that the velocity-to-be-gained will be zero at the time of motor burnout, $t_b$. As illustrated in FIG. 2 for an arbitrary initial time, $t_0$, the integral of the future thrust acceleration vector, $\underline{a}_T$, is accumulated along the arc of a circle whose chord is $\underline{V}_G(t_0)$. If one chooses the length of this circular arc so that the motor does burn out at its end point, then $\underline{V}_G$ will be zero at this time:

$$\underline{V}_G(t_b) = \underline{V}_G(t_0) - \int_{t_0}^{t_b} \underline{a}_T dt = 0$$

This method of steering is to be contrasted with thrusting along the $\underline{V}_G$ vector itself, which requires the ability to terminate thrust when $\underline{V}_G$ becomes zero.

The method of choosing the circular arc (i.e., the initial wasting angle, $\theta$) is based on the fact that the total arc length is just the integral of the future thrust acceleration magnitude, and thereby directly related to the remaining specific velocity capability of the motor, $V_R(t_0)$. The concept here is that one can characterize the total motor capability by the integral of acceleration magnitude from ignition to burnout, a quantity which depends only on the specific impulse of the fuel and the ratio of initial to final mass. Assuming that this quantity, referred to as $V_T$, the total specific velocity capability, is well controlled by the manufacturer, $V_R(t_0)$ can be determined by calculating and subtracting the specific velocity consumed since ignition:

$$V_R(t_0) = V_T - \int_{t_{ign}}^{t_0} |\underline{a}_T| dt$$

The requirement for burnout at $\underline{V}_G$=0 then reduces to choosing the arc length to match $V_R(t_0)$. Since the arc is circular, $\theta$ is obtained from the relation:

$$\frac{\sin\theta}{\theta} = \frac{|\underline{V}_G(t_0)|}{V_R(t_0)}$$

with the default solution $\theta$=0 when $|\underline{V}_G(t_0)|>V_R(t_0)$. The plane in which this fuel depletion maneuver takes place is arbitrary. In the current implementation of this algorithm, it is selected prior to launch by the fire control system.

Path and Energy Management Steering

The method for achieving position as well as velocity control at motor burnout is a direct extension of the previously used Energy Management Steering and is referred to as Path and Energy Management Steering. As in the Energy Management Steering used for velocity control, a hodograph of accumulated specific velocity $$\left(\int_{t_0}^{t} \underline{a}_T dt\right)$$

is chosen with an arc length that produces burnout at the terminus of the initial relative velocity vector, $\Delta\underline{V}(t_0)$. This makes $\Delta\underline{V}$=0 at the burn-out time, $t_b$.

Figure 3:
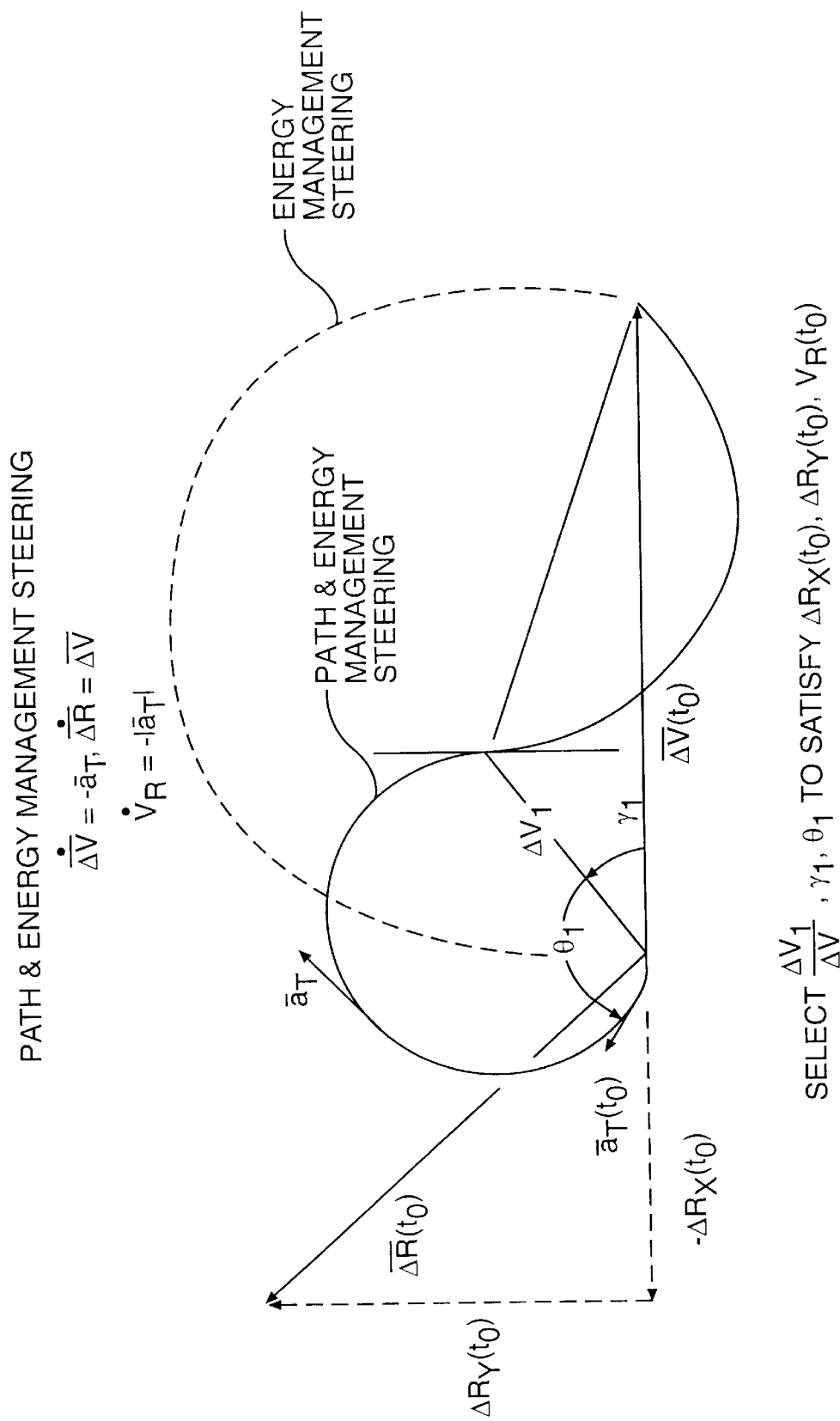
FIG. 3 is a hodograph of velocities for a missile having a solid fuel motor, using the presently disclosed method of path and energy management steering.

To simultaneously obtain position control, a hodograph consisting of two circular arcs is constructed, with both arcs in the plane of relative motion (defined by $\Delta\underline{R}(t_0)$ and $\Delta\underline{V}(t_0)$) and constrained to be tangent at their intersection point. Referring to FIG. 3, the geometry of the hodograph is completely specified by the initial wasting angle, $\theta_1$, and the location $$\left(\gamma_1, \frac{\Delta V_1}{\Delta V}\right)$$

of the transition point between the two circular arcs. For given $\Delta V=|\Delta\underline{V}(t_0)|$, the object is to choose these three control variables so that the two planar position requirements, $\Delta R_x(t_0)$ and $\Delta R_y(t_0)$, and the fuel requirement, $V_R(t_0)$, are satisfied. $\Delta R_x(t_0)$ and $\Delta R_y(t_0)$ are the along-track and lateral components of initial relative position, defined in the figure to be along and perpendicular to the initial relative velocity vector, $\Delta\underline{V}(t_0)$, respectively. For injection near apogee of the exit boost trajectory, the along-track or X direction will typically be close to the local horizontal. $\Delta R_y(t_0)$ will then approximately correspond to the vector sum of the altitude and cross-track (out of plane) displacements, and the guidance maneuver will take place in the corresponding lateral plane.

Although the three control variables to be determined are, in general, interacting, it is useful to think of $\theta_1$ as the variable used to satisfy the fuel or arc length requirement for each choice of the transition point. With this requirement satisfied, $$\frac{\Delta V_1}{\Delta V} \quad \text{and} \quad \gamma_1$$

are chosen so that the resulting velocity hodograph brings $\Delta R_x$ and $\Delta R_y$ to zero at burnout.

Position Control

FIG. 4 illustrates the relationship between the velocity hodograph and the corresponding change in relative position. The right half of the figure is drawn in velocity space and shows again how the specific velocity $$\left(\int_{t_0}^{t} \underline{a}_T dt\right)$$

is accumulated along the hodograph until it matches $\Delta\underline{V}_0$ at burnout. At any point along this hodograph, such as the time $t_1$, it is to be noted that the relative velocity vector has been reduced from $\Delta\underline{V}_0$ to $\Delta\underline{V}_1$ in accordance with the relation:

$$\Delta \underline{V}_1 = \Delta \underline{V}_0 - \int_{t_0}^{t_1} \underline{a}_T dt$$

The left half of the figure now shows the corresponding path of relative position that will be produced by this hodograph. It is imagined that the missile is fixed at the origin of the $\Delta \underline{R}_0$ vector and that the-desired satellite is approaching this point with a velocity vector which is just the relative velocity shown in the hodograph ($d(\Delta \underline{R})/dt=\Delta \underline{V}$). For $\Delta \underline{R}$ to become zero at burnout, the initial relative position vector must be parallel but opposite to the time averaged relative velocity:

$$\Delta \underline{R}(t_b) = \Delta \underline{R}_0 + \Delta \underline{V}_{ave}(t_b - t_0) = 0$$

Conversely, for given $\Delta \underline{R}_0$, one must choose the hodograph (and in particular, the parameters $$\frac{\Delta V_1}{\Delta V} \text{ and } \gamma_1$$

so that the average relative velocity does bring $\Delta \underline{R}_0$ to zero. It can be observed that the actual path of relative motion is also an, S shaped curve, with its local tangent in the direction of the corresponding relative velocity vector.

Position Control Capability

Figure 5:
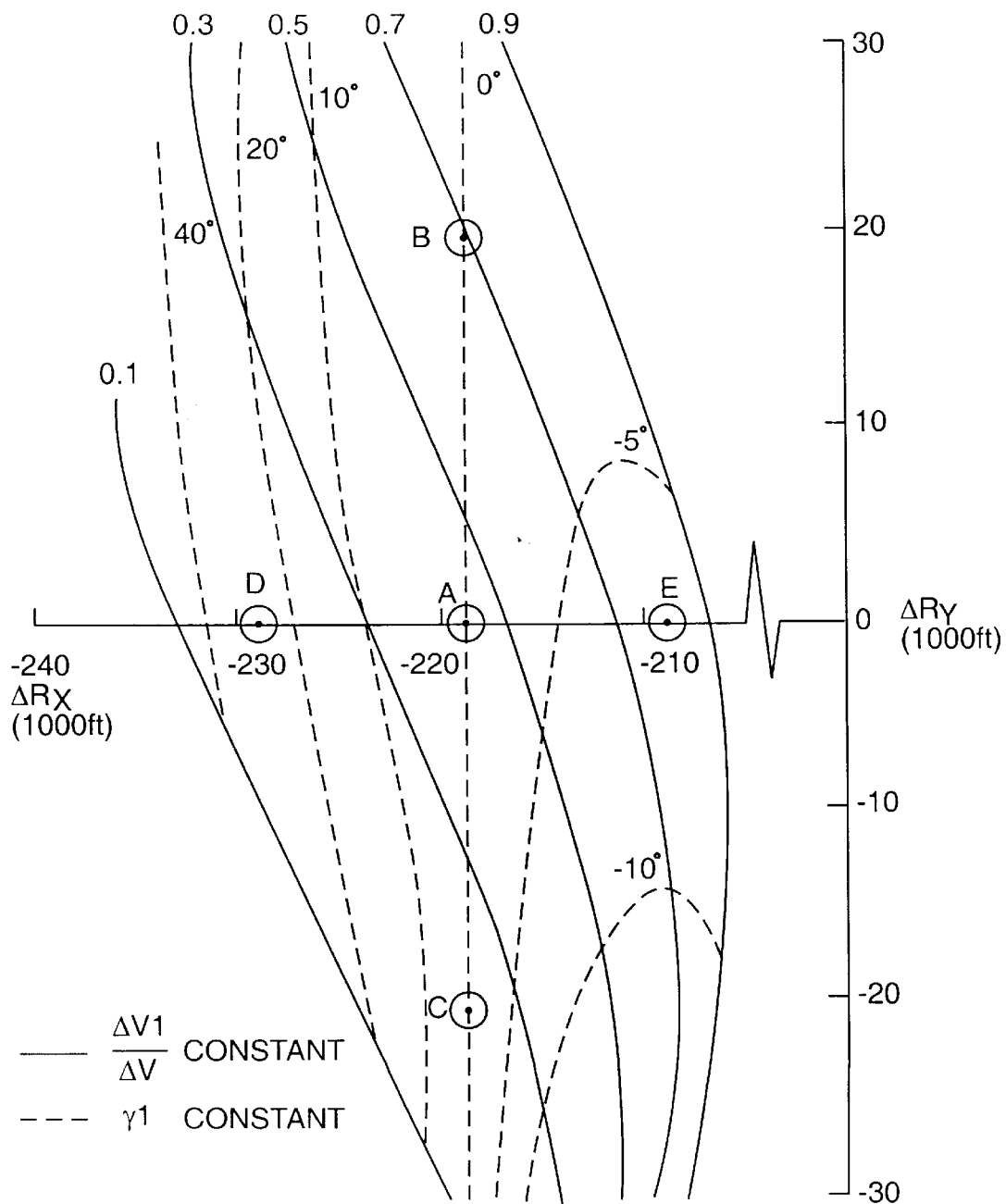
FIG. 5 is a diagram illustrating the relationship of position control capability to selectable hodograph parameters for a typical operational trajectory, using the presently disclosed method of path and energy management steering.
Figure 6:
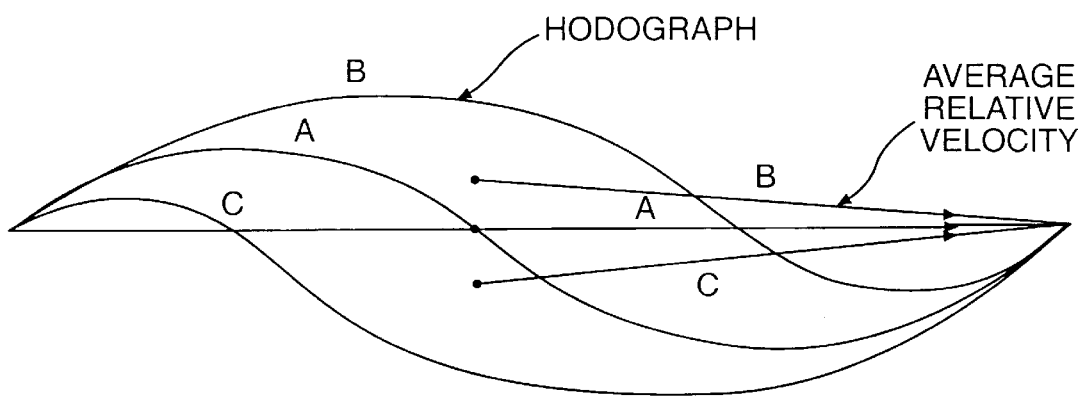
FIG. 6 is a diagram of the hodographs used to produce control of lateral displacements for a typical operational trajectory, using the presently disclosed method of path and energy management steering.
Figure 7:
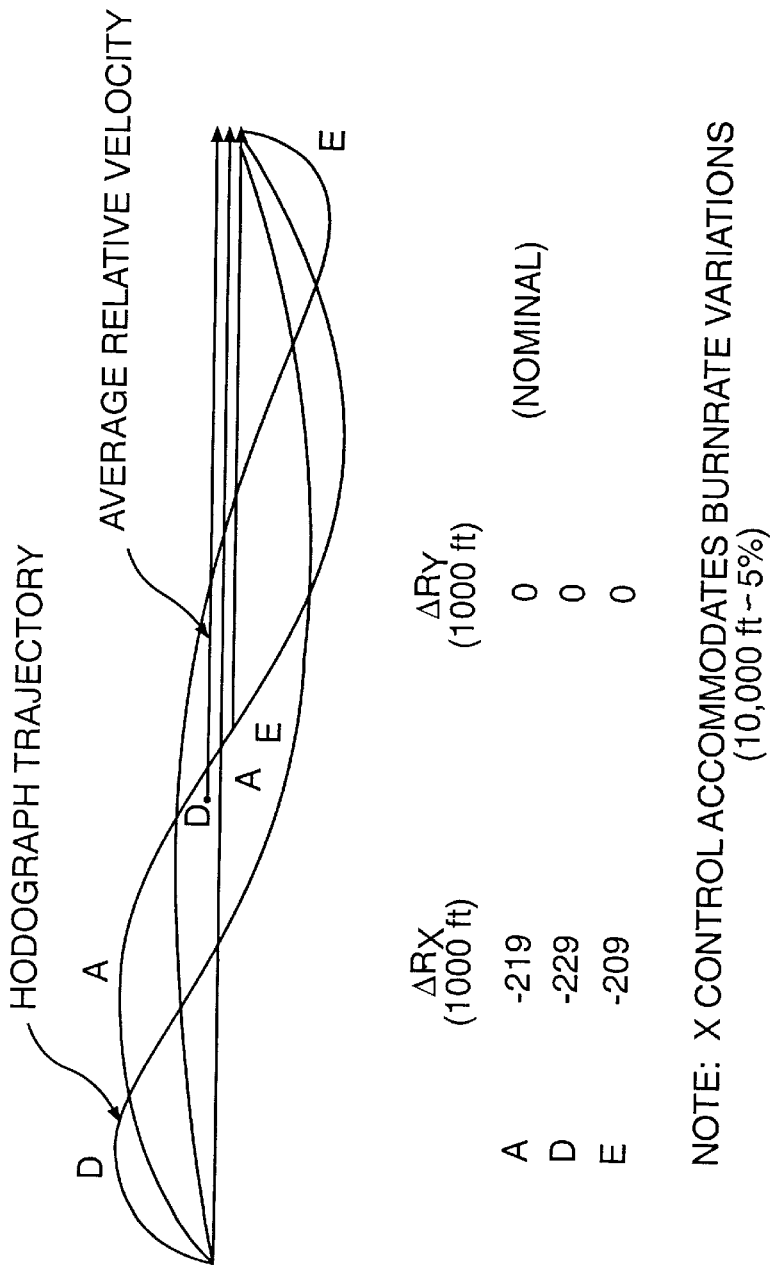
FIG. 7 is a diagram of the hodographs used to produce control of along track displacements for a typical operational trajectory, using the presently disclosed method of path and energy management steering.
Figure 8:
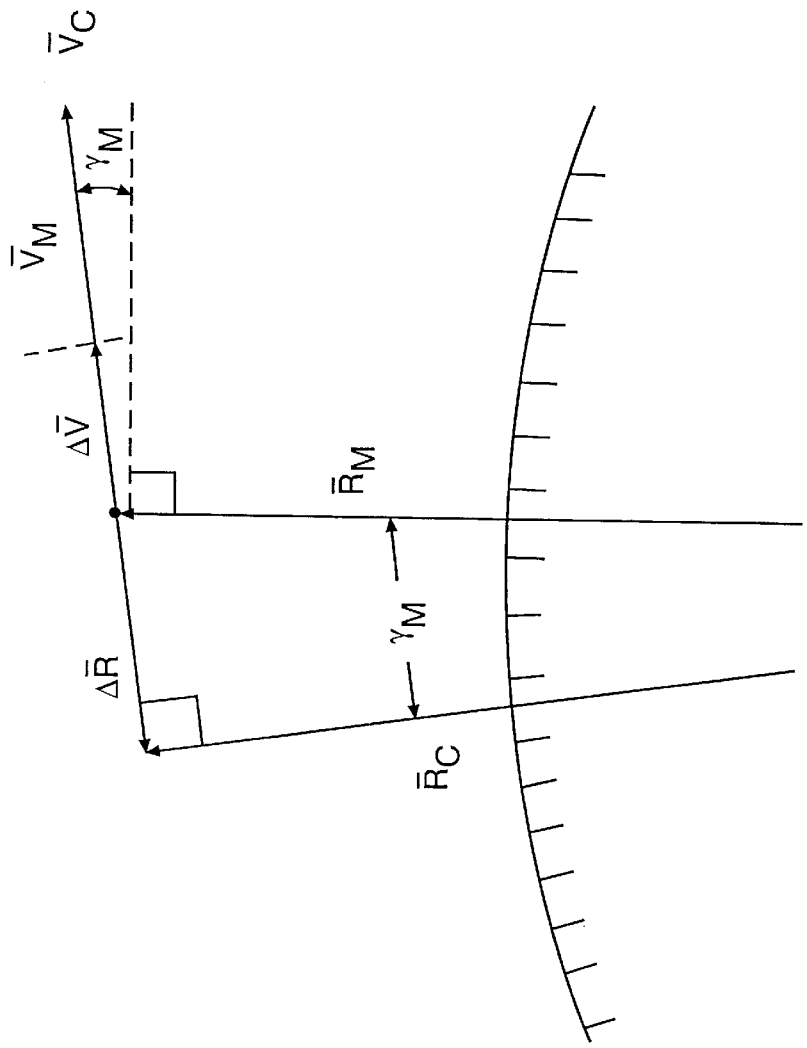
FIG. 8 is a diagram illustrating a possible solution for the nominal injection geometry at the point of injection stage ignition, using the presently disclosed method of path and energy management steering.

The capability of the Path and Energy Management Steering algorithm is illustrated in FIG. 5 for a typical operational trajectory. The drawing is in the form of a nomograph in which the initial values of the lateral and along-track relative position ($\Delta R_y$ and $\Delta R_x$) that will be brought to zero by the hodograph are plotted as a function of the two control parameters, $$\frac{\Delta V_1}{\Delta V} \text{ and } \gamma_1.$$

As discussed previously, the value of $\theta_1$ has been chosen for each transition point so that $\Delta \underline{V}=0$ at burnout. It is clear from the figure that the algorithm can accommodate variations in the initial relative position of ±30,000 ft in the lateral direction ($\Delta R_y$), ±10,000 ft in the along-track direction ($\Delta R_x$), and a 20,000 ft ($\Delta R_y$) by 5,000 ft ($\Delta R_x$) region of simultaneous variations. This capability is measured with respect to a nominal maneuver represented by point A, which would be obtained by shaping of the nominal exit trajectory. It is achieved with control limits of $$0.1 < \frac{\Delta V_1}{\Delta V} < 0.9$$

and $|\gamma 1| < 30°$, which produce reasonable hodographs. The capability is of course also dependent on the booster, payload and orbit. The results given correspond to an injection stage with a velocity capability ($V_R$) which is 9% greater than the velocity increment ($\Delta V$) required for a circular orbit at an altitude of 335 nautical miles.

With regard to choosing the control parameters for given values of $\Delta R_x$ and $\Delta R_y$, it can be observed from the contours plotted that an iterative algorithm should converge without difficulty in the region shown. It is also pointed out that if it is unnecessary to provide precise along-track control, one can restrict the solution to $\gamma_1=0$, corresponding to a transition point that is located on the initial $\Delta \underline{V}(t_0)$ vector. In this case, it can be shown that the value of $\theta_1$ is independent of $$\frac{\Delta V_1}{\Delta V}$$

and is precisely the same as that required for a single GEMS arc:

$$\frac{\sin \theta_1}{\theta_1} = \frac{\Delta V}{V_R}$$

The value of $$\frac{\Delta V_1}{\Delta V}$$

would then be determined from the requirement on $\Delta R_y$ alone.

With $\gamma 1=0$, it is observed that the two arc Path and Energy Management Steering maneuver reduces to a single Energy Management Steering arc in the limit as $$\frac{\Delta V_1}{\Delta V}$$

approaches 0 or 1. The corresponding maximum position change is the quantity that will be checked prior to 3rd stage ignition and used to initiate default guidance. As discussed previously, the default guidance would simply use Energy Management Steering in the appropriate direction to minimize the lateral position error if it cannot be completely reduced to zero. In addition, the velocity-to-be-gained would be changed from the relative velocity, $\Delta \underline{V}$, to a quantity that compensates for the residual position error in the sense of achieving some subset of the desired orbital elements.

Lateral Position Control

The next two figures illustrate the shape of the hodographs that will produce separate control of the lateral and along track displacements. Both figures are drawn to scale, and correspond to the conditions and solutions (A, B, C, D, E) indicated in FIG. 5, Typical Position Control Capability with Path and Energy Management Steering.

Lateral or Y position control, with $\Delta R_x$ fixed at its nominal value, is obtained by moving the transition point along the initial $\Delta \underline{V}(t_0)$ vector. Because of the non-constant thrust acceleration, a small change in $\gamma_1$ is actually necessary to keep $\Delta R_x$ constant. This is imperceptible in the scale to which FIG. 5 is drawn. For positive $\Delta R_y$ (solution B), the size of the first arc is increased $$\frac{\Delta V_1}{\Delta V}$$

greater than nominal), thereby raising the average relative velocity vector and producing an average $\Delta V_y$ that is negative. The converse is of course true for solution C. It should be observed that the negative $\Delta R_y$ corresponding to solution C can also be obtained by flipping solution B 180° about the $\Delta \underline{V}(t_0)$ vector. In order to provide adaptability to motor variations, it is desirable to select a solution like B in which the first hoop is larger than the second hoop. This is easily done by choosing the sense of the Y direction so that $\Delta R_y$ is initially positive.

As a final comment, it is noted that the nominal solution A actually has a transition point which lies to the left of the midpoint of the $\Delta \underline{V}(t_0)$ vector $$\left(\frac{\Delta V_1}{\Delta V} < .5\right).$$

The reason for this is that the relatively low thrust acceleration during the early part of the 3rd stage causes the missile to spend more time accumulating velocity in the first hoop. In order to keep the time-averaged Y velocity zero, this is then compensated for by reducing the size of this arc.

Along-Track Position Control

Adjustments to the along-track or X displacement, with $\Delta R_y=0$, are obtained by simultaneous control of $$\frac{\Delta V_1}{\Delta V} \text{ and } \gamma_1.$$

By moving the transition point up and to the left ($\gamma 1>0$ and $$\frac{\Delta V_1}{\Delta V} < \left(\frac{\Delta V_1}{\Delta V}\right)$$

nominal, solution D), the X component of relative velocity is kept large for a longer period of time, with the result that the desired satellite is brought into the missile from a greater distance. Conversely, the solution E $$\left(\gamma_1 < 0 \text{ and } \frac{\Delta V_1}{\Delta V} > \text{nominal}\right)$$

reduces the relative velocity quickly and produces a smaller change in $\Delta R_x$.

As discussed previously, these adjustments to the along-track displacement need not be made if the satellite phasing is not important or if there are no variations in motor performance. As noted on the figure, however, a variation of 5% in the motor burnrate, which is the most significant perturbation, can be accommodated if necessary. The method for accomplishing this is to estimate the burn rate in flight by comparing the time required to achieve the current specific velocity with that required in a nominal burn. It can be shown that the ratio of these two times, which inversely measures the actual burnrate, is also equal to the ratio (in both X and Y) of actual position change on a given hodograph to the corresponding nominal change. In symbols, and with β a burnrate parameter defined by the ratio of nominal time since ignition, $\Delta t_{nom}$, to the actual time, $\Delta t$, required to achieve the current specific velocit $$\left(\int_{t_0}^{t} |a_T| dt\right):$$

$$\beta = \frac{\Delta t_{nom}}{\Delta t}$$

then the result is that:

$$\Delta R_x = \frac{1}{\beta}(\Delta R_x)_{nom}$$

$$\Delta R_y = \frac{1}{\beta}(\Delta R_y)_{nom}$$

for a given hodograph. Based on this scaling, one can adjust for a constant burnrate variation by passing the sequence of measured time ratios $$\left(\frac{\Delta t_{nom}}{\Delta t}\right)$$

through a low-pass filter to determine the average value of β and by multiplying the actual requirements on $\Delta R_x$ and $\Delta R_y$ by this estimate of burnrate. When these adjusted requirements are then used in conjunction with a nominal motor model to determine the hodograph, the result will in fact be correct for the actual motor. By way of illustration, a motor with a+4.6% variation in burnrate when used along hodograph D will produce an actual $$\Delta R_x \text{ of } \frac{-229}{1.046} = -219 \text{ thousand feet,}$$

the nominal value produced by hodograph A with no variation in burnrate.

Nominal Injection Geometry

In order to provide the maximum capability for adjusting lateral position, it is desirable to have the nominal injection stage burn correspond to $\Delta R_y=0$ (point A in FIG. 5, Typical Position Control Capability). By definition, this represents a relative displacement ($\Delta \underline{R}$) which is opposite to the relative velocity ($\Delta \underline{V}$) at the time of injection stage ignition. As shown on the figure for a circular satellite orbit, one possible solution for this requirement is to add the velocity $\Delta \underline{V}$ along the initial direction of missile velocity ($\underline{V}_M$) so that the resulting coast velocity ($\underline{V}_C$) will be perpendicular to $\underline{R}_C$. The implication of this geometry is that the nominal 3rd stage ignition should occur just prior to apogee, with a missile flight path angle (γM) given by:

$$\gamma_M = \tan^{-1}\frac{(-\Delta R_x)\text{nominal}}{R_C}$$

where ($\Delta R_x$) nominal is a function of the required $\Delta V$ and:

$$\Delta V = \sqrt{\frac{\mu}{R_C}} - V_M$$

For the typical operational trajectory considered, ($\Delta R_x$) nominal $=219\times10^3$ ft and γM is the order of 0.5°. For this solution, it is noted that the boost pitchover is shaped so that the resulting exit coast trajectory has an apogee which is slightly greater than the required orbital altitude.

Typical Control Sequence in Velocity Space

Figure 10:
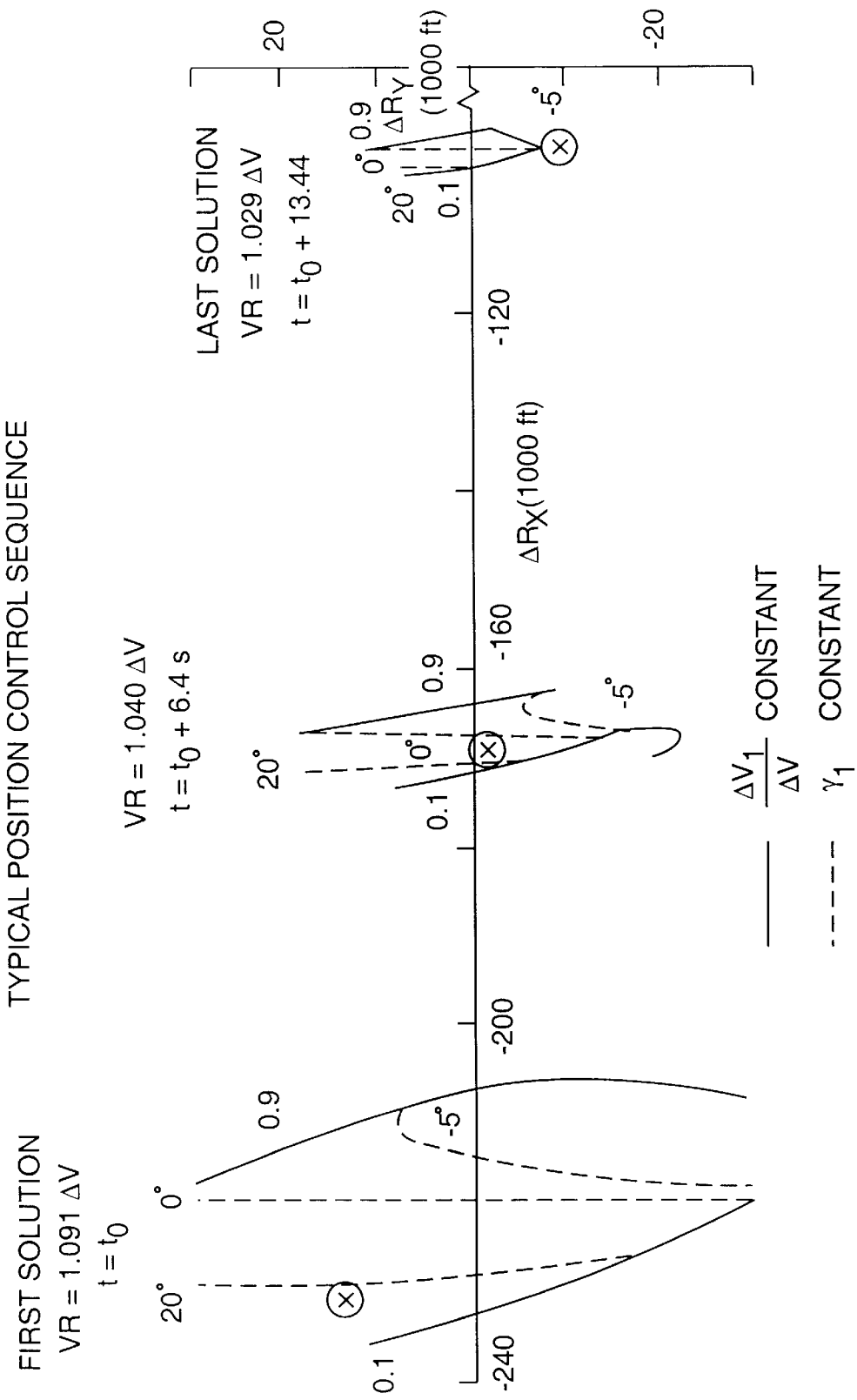
FIG. 10 is a diagram illustrating a typical sequence of control solutions in position space, using the presently disclosed method of path and energy management steering.

FIGS. 9 and 10 illustrate the sequence of solutions obtained in a closed loop simulation of the Path and Energy Management Steering algorithm. As mentioned previously, the solution is repetitively calculated in flight in order to reduce the effects of variations in motor performance, imperfect auto pilot response, atmospheric drag, and the algorithm errors introduced by ignoring the difference in gravitation between the desired satellite and missile. In the particular simulation shown here, the auto pilot was assumed to follow the commands exactly and a nominal motor was used. The purpose of the simulation was simply to verify the integrity of the algorithm, including the gravitational approximation.

The initial solution was obtained for position variations of $\Delta R_x(t_0)-(\Delta R_x)$nominal$=-11$ Kft and $\Delta R_y(t_0)=14$ Kft. It used the baseline conditions described previously, which correspond to an initial velocity capability ($V_R$) which is 9% greater than the velocity requirement ($\Delta \underline{V}$). Referring to FIG. 9, it will be seen that subsequent recalculations of the solution at major cycle frequency—while flying the missile with the commanded acceleration direction—did produce the expected result: a new hodograph which is nearly the same as the remainder of the original hodograph. Two such recomputations are shown, where the rotation of the along track and lateral directions is to be noted.

The final solution occurs just prior to the transition point, which is a programmed exit based on the value of $$\frac{\Delta V_1}{\Delta V} \text{ (and } \gamma_1\text{)}.$$

At this point, the required hodograph has been reduced to a single Energy Management Steering arc, and this simpler algorithm can be used for the remainder of the injection stage burn. It is to be noted that the required plane of Energy Management Steering is now determined in flight by the last Path and Energy Management Steering solution.

Typical Control Sequence in Position Space

The solution sequence illustrated on the previous figure in velocity space is now shown in position space. The points ⊗ represent the sequence of initial relative positions that will be brought to zero by the corresponding contour values of $$\frac{\Delta V_1}{\Delta V} \text{ and } \gamma_1.$$

The reduction in the size of the available control region as the solution progresses and the excess velocity capability decreases is apparent. One can also note the oscillation in the lateral component of relative position ($\Delta R_y$) and the relatively rapid reduction in $\Delta R_x$. The last solution occurs at the boundary of the available control region, which again corresponds to a single Energy Management Steering arc. One can regard the Path and Energy Management Steering calculations that are made during the first hoop as establishing the correct conditions for a single hoop solution at the transition point $\Delta R_y$ and $\Delta R_x$ are then brought to zero by continued steering with the simpler Energy Management Steering algorithm.

SUMMARY OF THE INVENTION

The disclosed invention provides an explicit solution to the satelllite injection problem with a solid propellant booster. Flexible orbit conditions can be achieved in six dimensions without thrust termination. The algorithm is a direct extension of the previously used Energy Management Steering and will require steering rates that remain moderate. The algorithm provides adaptability to burn rate variations and will produce an accurate injection state with post boost velocity trim.

What is claimed is:

1. A method of injecting a missile, having a post boost solid fuel motor, into a satellite orbit, comprising:

(a) controlling a time of ignition of the post boost solid fuel motor; and (b) guiding the missile along a hodographic path having two hoops, during burning of the post boost solid fuel motor, fuel of the post boost solid fuel motor being totally consumed as the missile attains the desired position and velocity for the satellite orbit at the time of post boost solid fuel motor burnout.

2. A method of injecting a missile, having a post boost solid fuel motor, into a satellite orbit, comprising:

(b) controlling a time of ignition of the post boost solid fuel motor;

(b) determining an along-track displacement of the missile with respect to the satellite orbit;

(c) determining a cross-track displacement of the missile with respect to the satellite orbit;

(d) determining a velocity-to-be-gained to an orbital velocity on the satellite orbit with respect to a current missile velocity; and (e) guiding the missile along a hodographic path having two hoops during burning of the post boost solid fuel motor, the hodographic path being such that, at a time that the post boost solid fuel motor burns out, along-track displacement is driven to zero, cross-track displacement is driven to zero and velocity-to-be-gained is driven to zero.

3. A method of injecting a missile, having a final stage solid fuel motor, into a satellite orbit, comprising:

(a) controlling a time of ignition of the final stage solid fuel motor;

(b) determining an along-track displacement of the missile with respect to the satellite orbit;

(c) determining a cross-track displacement of the missile with respect to the satellite orbit;

(d) determining a velocity-to-be-gained to attain an orbital velocity for the satellite orbit with respect to a current missile velocity; and (e) guiding the missile along a hodographic path having two hoops during burning of the final stage solid fuel motor, the hodographic path being selected so that at a time that the final stage solid fuel motor burns out, the along-track displacement is driven to zero, the cross-track displacement is driven to zero and the velocity-to-be-gained is driven to zero.

\* \* \* \* \*